Oct. 27, 1959     H. H. ARMSTRONG     2,909,823
SEALING SLIDE FASTENER HAVING LATERALLY CURVED PORTIONS
Filed May 19, 1955     4 Sheets—Sheet 1
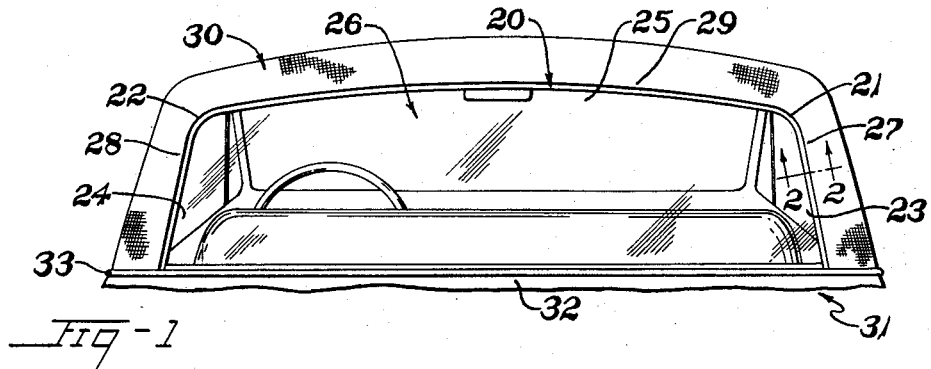
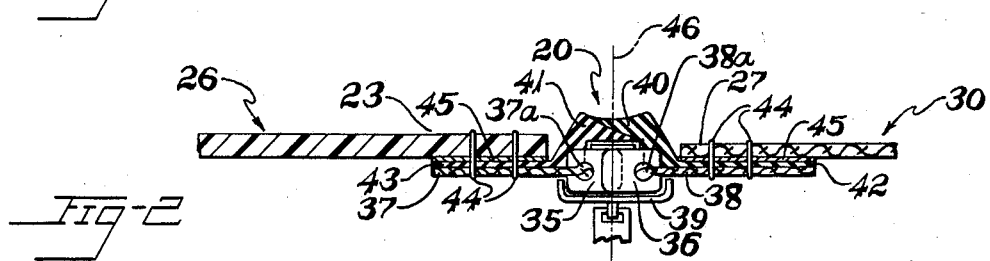
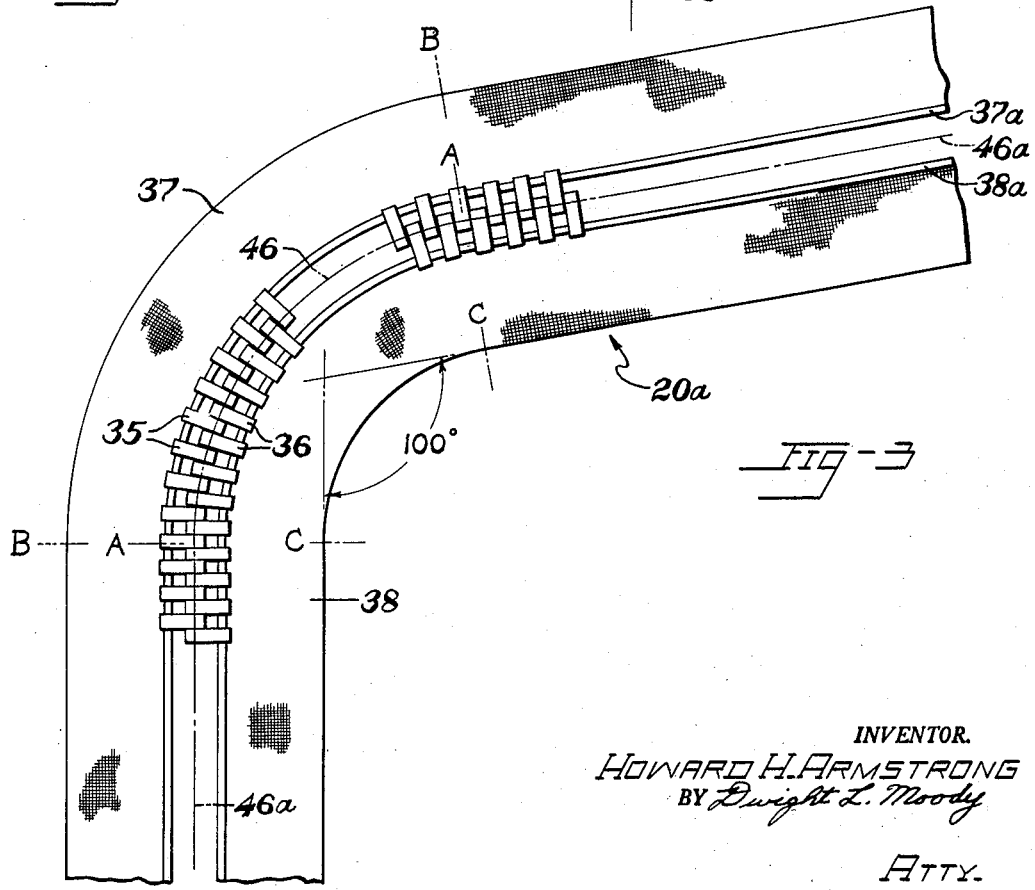
INVENTOR.
HOWARD H. ARMSTRONG
BY Dwight L. Moody
ATTY.

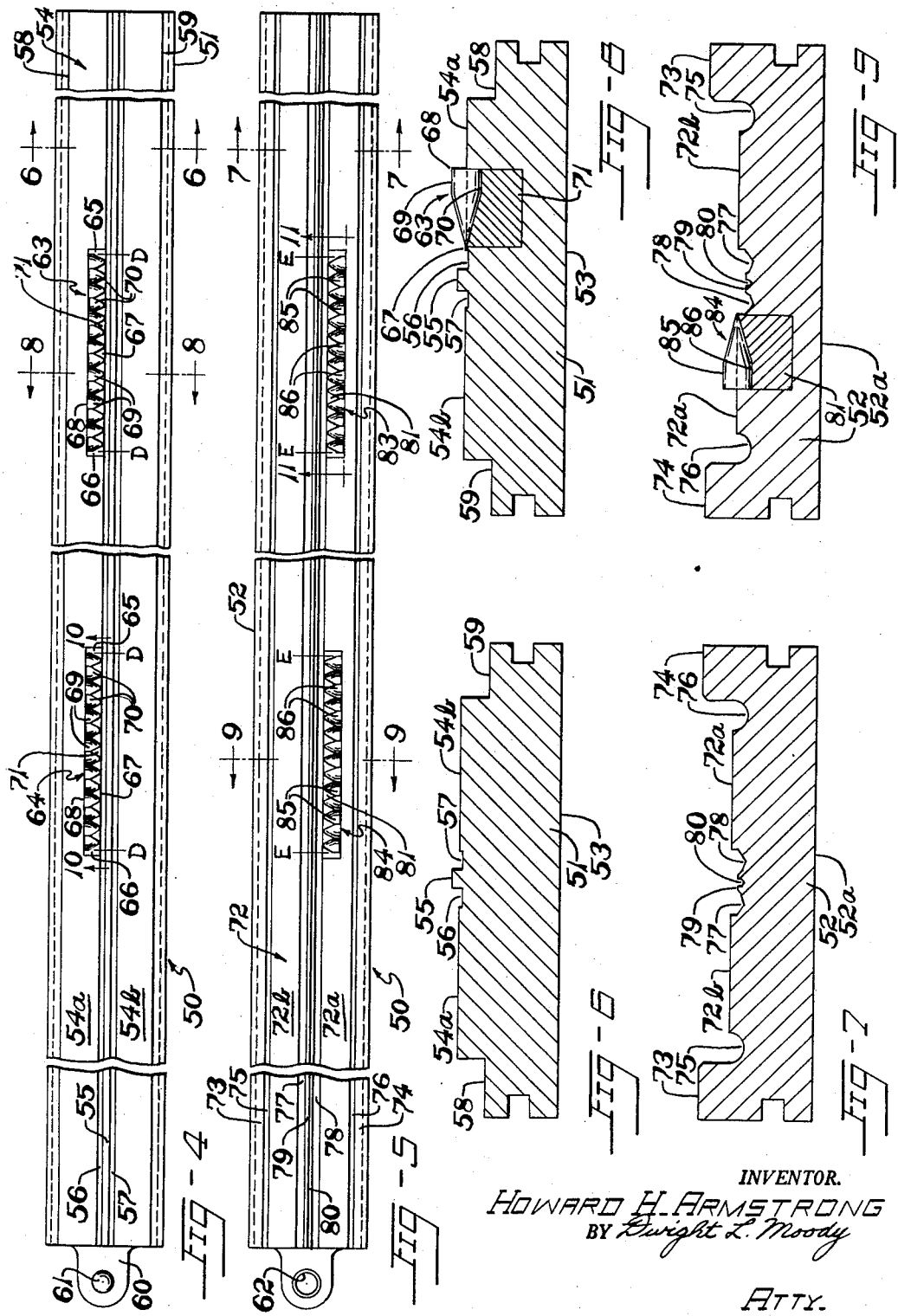

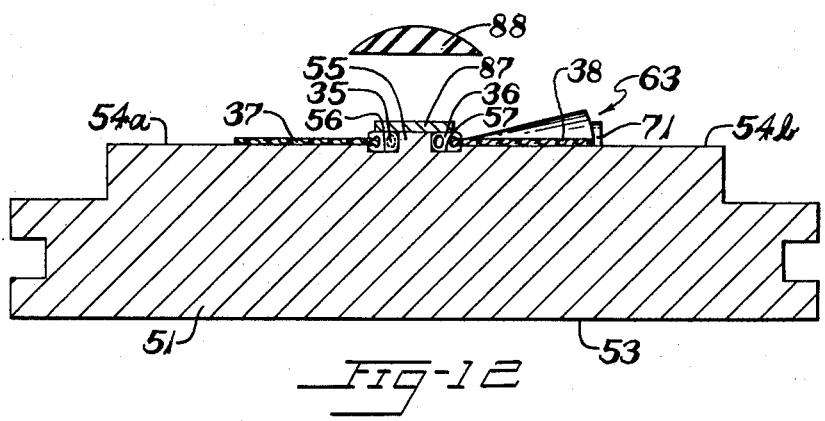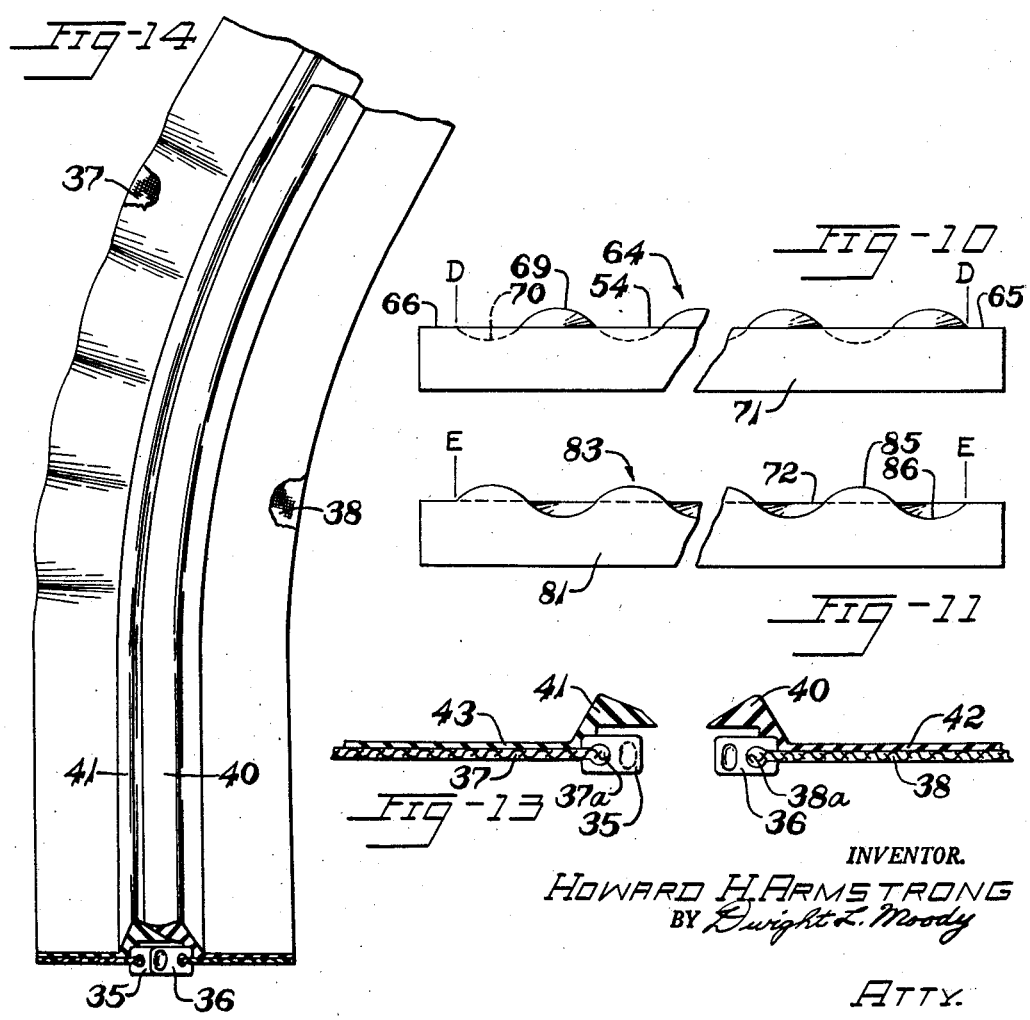

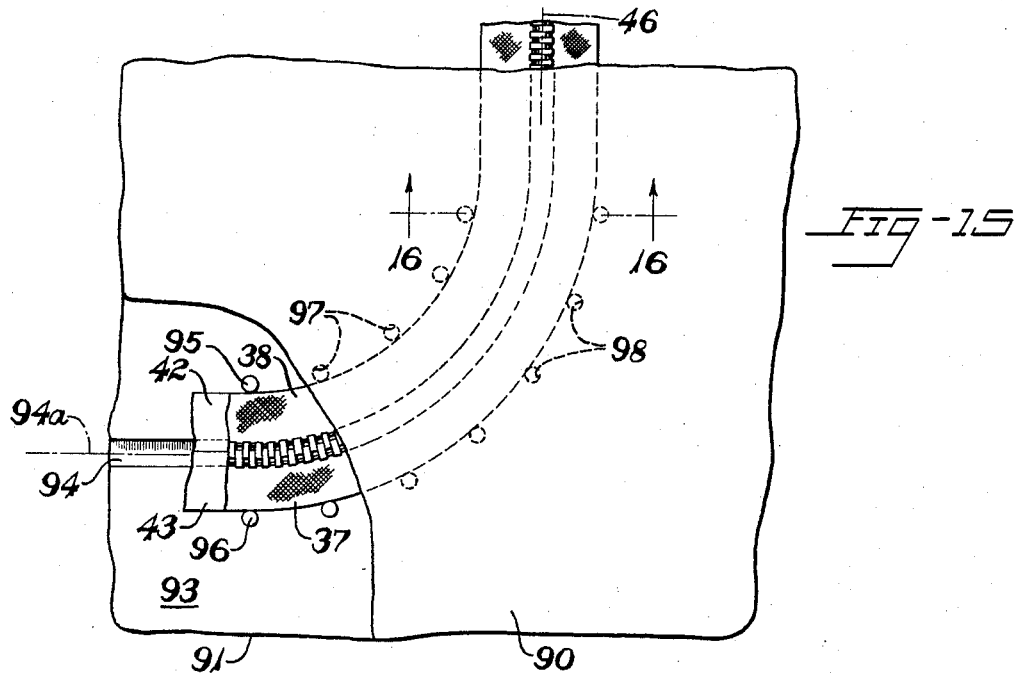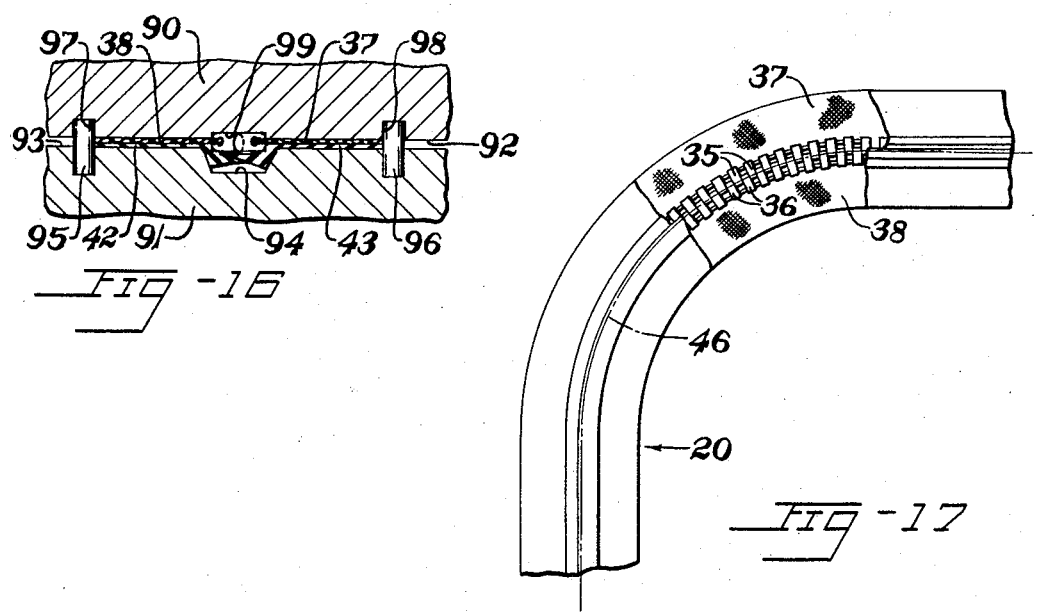

United States Patent Office 2,909,823
Patented Oct. 27, 1959

2,909,823

SEALING SLIDE FASTENER HAVING LATERALLY CURVED PORTIONS

Howard H. Armstrong, Cuyahoga Falls, Ohio, assignor to The B. F. Goodrich Company, New York, N.Y., a corporation of New York Application May 19, 1955, Serial No. 509,483

6 Claims. (Cl. 24—205.1)

The invention relates to separable fasteners including slide fasteners of the sealing type having one or more laterally curved portions intermediate the ends thereof, and relates to methods of and apparatus for making such curved sealing slide fasteners.

Customary practice, heretofore, has been to manufacture sealing slide fasteners in pre-determined, continuous, straight lengths each having a pair of flexible, stretch-resisting attaching margins or stringers or tapes of uniform length with interengageable fastener elements or teeth in series and elastic sealing elements thereon. Such straight fasteners have been generally suitable for commercial articles and structures in general. Nevertheless, the straight length of these fasteners and the uniform length and stretch-resistance of their pair of stringers have made the straight fasteners difficult to apply to articles and structures requiring localized lateral curvature along one or more reaches or zones or regions of such fasteners, and this has unduly limited their field of commercial and industrial applications.

In some cases, for example, the expedient of cutting suitable notches in both stringers along a reach of the straight fastener has been utilized to avoid buckling and folding of one stringer but facilitate lengthening of the other stringer, so as to permit localized lateral curvature of both stringers at the reach of the fastener. However, this notching is costly and time consuming in fitting and attaching the fastener to the article or the structure, and is also objectionable from the standpoint of strength and appearance of the attachment of the fastener to the article or the structure. In other cases, two or more independent, straight slide fasteners arranged in series have been connected at their adjacent ends in an angular relation (for example, an approximately ninety degree (90°) relation) to provide for their mounting along a path having one or more angular zones therein. This angular construction avoids buckling and notching of the stringers, but is expensive to make. Also, the angular construction makes it difficult to provide continuity of separability and sealing at said zones, and does not provide localized laterally curved reaches in the attachment as a whole.

An object of the invention is to provide an improved slide fastener of the sealing type having provision of lateral curvature of its attaching margins and sealing elements along a reach of determinate length and adapted to overcome the foregoing and other disadvantages of the prior constructions.

Other objects of the invention are to provide for improved apparatus and methods of making sealing slide fasteners having laterally curved attaching margins; to provide for forming at least one laterally curved reach in a sealing slide fastener, while maintaining the fastener in a continuous straight condition; to provide for molding a sealing slide fastener in a straight condition and in a manner effecting a permanent, laterally curved set in the attaching margins or stringers of the fastener; to provide for producing a laterally curved construction in a reach of a sealing slide fastener capable of fitting a limited range of differently curved paths, while avoiding notching of one or both attaching margins; to provide for effecting attachment of a continuous sealing slide fastener along a path having one or more relatively sharply curved zones or bends therein, together with provision of uniformity of strength of the attachment throughout its length and improved appearance along its length; and to provide for convenience of manufacture and installation and for uniformity of product.

Further objects of the invention are to provide improved apparatus for making a sealing slide fastener having at least one laterally curved reach therein; to provide apparatus for forming lateral curvature in a sealing slide fastener, while the fastener is maintained in a continuous straight condition; to provide apparatus for forming laterally curved sealing slide fasteners, while eliminating notching one or both attaching margins of the fasteners; to provide apparatus for making, molding and vulcanizing a sealing slide fastener with a laterally curved reach therein having provision for conforming to a plurality of curved paths or bends each of different radius of curvature; to provide apparatus for effecting permanent set in the laterally curved attaching margins along a reach of the sealing slide fastener; and to provide apparatus for molding an initial lateral curvature in a reach of a sealing slide fastener, while curing the same, and for subsequently re-forming the initially curved reach to produce a desired permanent set and a predetermined laterally curved configuration in the curved reach.

These and other objects and advantages of the invention will be apparent from the following description.

In the accompanying drawings which constitute a part of this specification and in which like numerals are employed to designate like parts throughout the same, Fig. 1 is an elevational view looking from the rear towards the front of an automobile showing a laterally curved pressure-sealing slide fastener attachment of the rear window to the flexible top of the automobile and constructed in accordance with and embodying the invention, parts being broken away, Fig. 2 is a sectional view taken along line 2—2 in Fig. 1, parts being broken away, Fig. 3 is a plan view of a commercial slide fastener of the non-sealing type, parts being broken away, Fig. 4 is a plan view from above of the lower half of a straight mold for making the laterally curved, pressure-sealing slide fastener shown in Fig. 1, the lower half being arranged to show its molding surface configuration, parts being broken away, Fig. 5 is a plan view from above of the top half of the straight mold laid back and arranged to show its molding surface configuration for making the laterally curved, pressure-sealing slide fastener shown in Fig. 1, parts being broken away, Figs. 6, 7, 8 and 9 are sectional views of the respective halves of the mold taken along lines 6—6, 7—7, 8—8, and 9—9 respectively, in Figs. 4 and 5, Figs. 10 and 11 are side elevational views taken along lines 10—10 in Fig. 4 and 11—11 in Fig. 5 showing attaching margin or stringer-shaping means including insert bars for the mold, parts being broken away, Fig. 12 is a sectional view of the lower half of the mold with a standard commercial slide fastener disposed thereon in fully separated condition preparatory to molding resilient rubber sealing elements upon the teeth of the fastener, parts being broken away and in section, Fig. 13 is a sectional view of the molded pressure-sealing slide fastener after removal from the mold and before engagement of the teeth and sealing elements, parts being broken away, Fig. 14 is a plan view of the molded pressure-sealing slide fastener having a laterally curved reach therein after removal from the mold and after engagement of the teeth and sealing elements, parts being broken away and in section, Fig. 15 is a plan view of a final-shaping mold in closed condition to re-form the laterally curved reach of the molded pressure-sealing slide fastener mounted therein, parts being broken away, Fig. 16 is a sectional view taken along line 16—16 in Fig. 15, parts being broken away, and Fig. 17 is a plan view from above of the molded pressure-sealing slide fastener having the re-formed laterally curved reach after removal from the final-shaping mold.

Window attachment construction

The automobile window attachment shown in Figs. 1 and 2 includes a continuous slide fastener 20 of the pressure-sealing type with molded-in, spaced-apart, laterally curved reaches or portions 21, 22 therein. The improved slide fastener 20 separably unites the two side margins 23, 24 and top margin 25 of a rear window 26 of suitable transparent, flexible plastic material with corresponding margins 27, 28 and 29 of a collapsible or foldable cover or top 30 of water-proof textile fabric or other suitable flexible, impervious wall material for an automobile 31 of the convertible type. The foldable top 30 has its bottom margin fixedly attached by known attaching means to a body 32 of the automobile, while the bottom margin of the flexible rear window 26 is fixedly attached by known attaching means to a wall of the mouth of a well or storage space (not shown) in the rear of the body 32, which well is adapted to receive the window and the foldable top. The junction of the window and the foldable top with the body 32 is covered by a trim strip 33 of suitable rust-resistant metal.

The flexible rear window shown in Fig. 1 is generally rectangular in shape for good viewing purposes and has curved upper corners for good appearance purposes. The laterally curved reaches 21, 22 of the slide fastener 20 extend conformingly along the sharply curved corners of the window which, for example, may have a radius of curvature of approximately five inches. The slide fastener 20, except for the laterally curved reaches 21, 22, may be constructed and arranged like the pressure-sealing slide fastener described and claimed in the Carroll P. Krupp Patent No. 2,545,817, issued March 20, 1951.

The pressure-sealing slide fastener 20 has fastener elements or teeth 35, 36 desirably of suitable strong metal mounted in series along each of the adjacent marginal edges including textile cord beads 37a, 38a of attaching margins or stringers 37, 38 desirably of flexible, knitted or square-woven fabric of cotton or nylon or other suitable textile material, which teeth are engaged and disengaged by manipulation of a runner or slider 39 to close and open the fastener. A pair of sealing elements 40, 41 of resilient, natural or synthetic, rubber, or other suitable elastic rubber-like material and of generally L-shape in cross-section, may be mounted in part upon the teeth and in part upon the attaching margins or fabric stringers at a face thereof and bonded thereto, as shown especially in Fig. 2. The sealing elements in the closed i.e. engaged position have laterally overlapping outer and inner marginal portions each tapering to an edge for effecting continuity of sealing along the fastener by resilient flexure and pressing of the edge of the tapered outer marginal portion slidably against the inclined seating surface of the tapered inner marginal portion. The fabric attaching margins 37, 38 have thin, continuous sealing layers or coatings 42, 43 of suitable resilient rubber in continuation of the rubber material of the sealing elements 40, 41.

The attaching margin or stringer 37 of the fastener 20 may be fixedly secured to the adjacent fabric margin of the automobile top 30 as by a double row of stitching 44, 44 of suitable strong, filamentary textile material or thread, and preferably a thin reinforcing tape or strip 45 of suitable rubberized, woven fabric material is disposed between the rubber surface of the attaching margin and the fabric top 30 for increased strength and sealing purposes. The other attaching margin or stringer 38 of the slide fastener 20 can be attached in like manner to the flexible, transparent rear window 26. The sealing elements 40, 41 are preferably disposed at the exterior of the automobile top 30 for good appearance and sealing purposes, while the teeth 35, 36 and the slider 39 are disposed at the interior of the top 30.

This makes feasible an attractive, neatly appearing and water-proof attachment of the rear window 26 to the automobile top 30 by the improved pressure-sealing slide fastener 20. A further advantage of the attachment is that the slider 39 can be manipulated from the interior of the top so as to open the slide fastener throughout its length. When the slide fastener 20 is opened, the rear window 26 can be flexed and disposed entirely within the well in the rear of the automobile body 32, whereupon air can freely flow through the rear opening in the top 30 as for cooling purposes. Then in case of rain or other undesirable weather conditions, the rear window 26 can be flexed and conveniently lifted from within the well in the rear of the automobile body 32 and can be quickly and easily secured in place in the rear opening in the automobile top 30 by operation of the slider 39 to close the slide fastener 20. Thus, the construction including the laterally curved pressure-sealing slide fastener 20 eliminates the need for cover flaps, snap fasteners and other attachment expedients, yet it provides a secure attachment and continuity of effective sealing between the rear window 26 and the foldable top 30.

Manufacture of a laterally curved sealing slide fastener

To the ends of conveniently and economically producing a continuous strip or length of pressure-sealing slide fastener 20 having at least one and preferably two laterally curved portions 21, 22, the invention provides forming and molding apparatus shown in Figs. 4 to 12, inclusive, and final-shaping mold apparatus shown in Figs. 15 and 16. The molding apparatus makes feasible the use of a continuous strip or length of a standard commercial slide fastener 20a of the nonsealing type which as manufactured and as shown in the closed condition in Fig. 3, has its untreated, woven fabric (desirably cotton fabric) stringers 37, 38 initially woven and formed at spaced-apart positions to a desired lateral curvature of suitable radius of curvature to provide for example, a five inch radius of curvature of the centerline i.e. median line of engagement of the teeth 35, 36, which median line is indicated by the numeral 46a. The teeth 35, 36 along the pre-formed curved portions are, in the engaged condition, inclined relative to the centerline 46a in the manner shown to promote ease of engagement of the teeth.

All portions of both stringers 37, 38, as manufactured, have limited longitudinal looseness so that they lie substantially flat and smooth in the same horizontal plane passing laterally through the fastener 20a including its pre-formed bends or sharply curved portions. Said pre-formed bends may be in excess of 90° angularity, for example, from about 100° to about 120° at the centerline 46a, as shown in Fig. 3, to facilitate the desired window attachment having each bend therein slightly exceeding 90°, for example, a 94° bend. The curvature of the pre-formed bends may be in the same lateral direction to one side of the centerline 46a of the slide fastener 20a. Thus, the continuous strip of standard slide fastener 20a has a generally U-shaped configuration in plan.

Ordinary molding apparatus for accommodating and maintaining the continuous strip of slide fastener 20a in its normal U-shaped configuration, while molding the resilient rubber sealing elements on the fastener, is not only cumbersome, unwieldy and difficult to handle, but is very expensive to make and maintain and is not suited to quantity production. The new and useful forming and molding means or apparatus shown in the drawings overcomes these disadvantages by virtue of its straight construction and arrangement maintaining the continuous strip of slide fastener 20a in a continuous straight line condition and in open or separated condition, while molding the rubber sealing elements on the slide fastener 20a, all without destroying the initial or pre-formed lateral curvature of the fabric stringers at the spaced-apart laterally curved reaches in the slide fastener 20a.

*Molding apparatus*

Although the forming and molding apparatus may be of multiple strip capacity, the particular embodiment shown has a single strip capacity and includes a two-piece, straight mold 50 of the desired length and other dimensions and of suitable metal such, for example, as aluminum alloy, cast iron, steel or other hard metal resistant to objectionable warping and deformation at the temperatures and pressures generally used for vulcanizing elastic rubber compositions. The mold 50 is preferably made of aluminum alloy for ease of handling, and has an elongated lower half or mold plate 51, shown molding surface up in Fig. 4, and has an elongated upper half or mold plate 52, shown in Fig. 5 laid back and molding surface up relative to the lower half 51.

The lower mold plate 51 has a lower supporting surface 53 for disposition upon a suitable curing press platen (not shown) and an elongated upper molding surface 54 which is flat throughout the major portion thereof and lies in a single horizontal plane and desirably extends continuously the full length of the lower mold plate. An upraised or outwardly projecting, separating rib or ridge 55 of suitable narrow, uniform width extends centrally along a straight path in the molding surface 54 intermediate its side margins and continuously from end to end of the mold plate 51, thereby dividing the molding surface lengthwise or longitudinally into two individual stringer-supporting, side surface areas 54a, 54b.

Shallow, straight teeth-receiving channels or grooves 56, 57 in the molding surface 54 are disposed immediately at the two sides of the separating rib 55 and extend unobstructed, continuously and in parallel relation from end to end of the mold plate 51. The shape, uniform depth and width of each shallow channel or groove 56, 57 are sufficient to accommodate snugly the lower parts of the teeth of the fastener, when the fabric stringer is lying flush against the adjacent molding surface 54. The uniform height to which the separating rib 55 projects above the horizonal plane of the molding surface 54 is sufficient to position the flat upper face of the separating rib in the horizontal plane of the upper faces of the teeth, when the teeth are seated in the grooves 56, 57 and the fabric stringers lie flush against the adjacent molding surface 54, as shown in Fig. 12.

The two sides of the lower mold plate 51 at its upper molding surface 54 are cut-away to provide suitable shaped side recesses 58, 59 for mold-register and locking purposes. A suitable extension 60 with upright dowel pin 61 projects from an end of the mold plate 51 to facilitate insertion of the dowel pin through an aperture in end extension 62 of the upper mold plate 52 for further registering and locking the mold plates.

The molding surface 54 of the lower mold plate 51 has at least one stringer-shaping means 63 and for the particular mold shown in the drawings, has a second stringer-shaping means 64. Each means 63, 64 is located in the side surface area 54a of the molding surface 54 to a side of the separating rib 55, and is adjacent and closely spaced from the sidewall of the teeth-receiving groove 56 remote from the separating rib 55, as shown especially in Fig. 8. Each means 63, 64 is located at a position lengthwise of the molding surface 54 corresponding to the desired lengthwise position of a laterally curved reach or portion in the molded sealing slide fastener strip 20, and also corresponding to the lengthwise position of a pre-formed, laterally curved reach or portion in the standard commercial slide fastener 20a.

The stringer-shaping means 63, 64 each has a rigid forming surface comprising an elongated, contoured smooth surface extending longitudinally of the molding surface 54 in a straight path from position "D" to position "D," and desirably comprising narrow, flat end surfaces 65, 66 in continuation of the contoured smooth surface and merging smoothly with adjacent planar portions of the molding surface 54, as shown in Fig. 4. The forming surface i.e. the contoured smooth surface and end surfaces 65, 66 has a substantially uniform width sufficient to equal the width of the fabric stringer and to entirely underlie and fully support a pre-formed, laterally curved reach or portion in the fabric stringer (for example, outer stringer 37), when the teeth (35) of the stringer are seated in the groove 56. The said fabric stringer (37) has a greater radius of curvature than that of the other (inner) stringer (38) of the fastener 20a. The side marginal edge 67 of the forming surface i.e. contoured smooth surface and end surfaces 65, 66 is closely spaced (for example, about 0.025″) from the sidewall in the groove 56 and is continuously straight and lies throughout its entire length in the horizontal plane of the adjacent flat molding surface 54. The other side marginal edge 68 of the forming surface i.e. the contoured smooth surface and end surfaces 65, 66 is continuously straight as viewed from above, but rises and falls sinuously in level along its contoured surface length between positions "D—D" relative to the horizontal plane of the adjacent flat molding surface 54.

The contoured smooth surface between position "D—D" has a plurality of interconnected, substantially uniform undulations extending laterally of said surface between the side marginal edges 67, 68, and providing a rhythmic succession of rounded wave-like crests 69, 69 and hollows 70, 70, as shown in Fig. 10, to accommodate and shape the fabric stringer 37 without producing objectionable localized wrinkles and tautness. The rounded crests 69, 69 rise above the level of both the straight, planar side marginal edge 67 and the adjacent flat molding surface 54, and the rounded hollows 70, 70 fall below the level of both the straight, planar side marginal edge 67 and the adjacent flat molding surface 54. Beginning at the planar side marginal edge 67, the uniform hollows 70, 70 increase gradually in depth toward the opposite edge 68 part way across and desirably across at least one-half the width of the contoured smooth surface, and thereafter are of substantially uniform heighth and depth, respectively, to said opposite or other side marginal edge 68. This advantageously avoids producing undue localized stretching and straining of the material of the fabric stringer while accommodating the latter during the molding operation.

The theoretical overall length of the contoured smooth surface from position "D" to position "D," as measured in the plane of the flat molding surface 54, must be at least equal to and is established by the arcuate extent of a particular laterally curved portion of the desired radius of curvature in the molded sealing slide fastener 20, as measured along the centerline, that is, the median line 46 of engagement of the teeth of the fastener. However, the theoretical overall length may also be established by the arcuate length (from position "A" to position "A") of the centerline or median line 46a along the particular laterally curved portion in the standard commercial slide fastener 20a shown in Fig. 3. This arcuate length between the positions "A—A" in the centerline 46a approximately corresponds to that of the centerline of the laterally curved portion in the molded sealing slide fastener 20. The said theoretical overall length of the contoured smooth surface establishes the theoretical length of the straight, planar side marginal edge 67 between positions "D—D," and must be at least equal to said arcuate length between the positions "A—A." It is to be noted that the theoretical length "D—D" of the marginal edge 67 substantially equals the arcuate length of the inner beaded edge 37a of the fabric stringer 37 in its curved reach between the positions "A—A" at the centerline 46a.

The substantially uniform undulations are of sufficient number and dimensions to provide a theoretical overall length of the vertically sinuous side marginal edge 68 between positions "D—D," as measured conformingly along the curvature of the rounded crests and hollows, corresponding to at least the greatest arcuate length in the outer stringer 37 in the laterally curved portion of the slide fastener 20a, that is, the arcuate length of the outer marginal edge of the fabric stringer 37 from position "B" to position "B" therein. The construction and arrangement provides sufficient length of the contoured smooth surface, measured longitudinally from any position across its width, to accommodate all the material of a curved reach in the fabric stringer 37 without objectionable wrinkling and stretching of the same, when the stringer is pressed into full continuous conformance with the undulations in the contoured smooth surface during the molding operation.

From the foregoing discussion it will be understood that the theoretical minimum overall length of the contoured smooth surface required to produce a laterally curved portion having a particular radius of curvature, is established in part by the shortest arcuate length of a curved reach of the outer stringer 37 as measured along the centerline 46a from position "A" to position "A," and is established in part by the greatest arcuate length of the curved reach of the outer stringer 37 as measured from position "B" to position "B" along the outer marginal edge of the stringer as shown in Fig. 3.

From the standpoint of practical manufacturing practice, it has been found that the theoretical overall length of the contoured smooth surface and hence the said forming surface of means 63, 64, must be increased a suitable amount so that the actual overall length of the contoured smooth surface from position "D" to position "D" equals a certain surplus length plus the said theoretical overall length. This actual overall length is preferably sufficient to accommodate standard manufacturing tolerances in the spacing and size of the teeth and in the looseness of weave and fullness of material of the fabric stringer 37 of the commercial slide fastener 20a, and also sufficient to accommodate limited longitudinal shifting and localized working (shortening and/or lengthening) of the fabric stringer 37, while it is being mounted upon the mold plate 51. The actual overall length of the contoured smooth surface varies not only with the desired arcuate length of each laterally curved portion in the molded slide fastener and fullness of material in the laterally curved part of the outer stringer, and with the desired total length of the continuous strip to be produced, but also varies with the longitudinal spacing between the laterally curved portions and the particular construction of the fabric stringers in the commercial slide fastener 20a. Thus, the actual overall length of the contoured smooth surface has provision for accommodating a length of the outer stringer substantially in excess of the arcuate length of either marginal edge in the outer stringer at the laterally curved portion in the commercial slide fastener 20a, whereby a contoured or undulated length of the molded outer stringer (see Fig. 14) is produced which exceeds that required by the laterally curved reach in the commercial slide fastener 20a.

This increased undulated length of the molded outer stringer assures obtaining the desired lateral bend (for example, about 100°) having the designed radius of curvature (for example, 5" radius) of the centerline 46, when the molded slide fastener 20 is conformed and bent laterally during its attachement to the structures to be joined i.e. the automobile top and the rear window. It permits limited longitudinal shifting of the center of radius of curvature of the centerline 46 of the laterally curved portion in the molded slide fastener 20. It facilitates fitting the said laterally curved portion to a centerline radius of curvature which can be slightly less (for example, about 4" radius), or can be substantially greater (for example, about 7" radius) than the designed radius of curvature (for example, 5" radius).

A suitable practical forming surface of each means 63, 64 for accommodating and shaping the laterally curved portion of the outer stringer 37 of the commercial slide fastener 20a having a designed lateral bend of about 100° and radius of curvature of 5" of the centerline 46a, may have the following dimensions, although not necessarily limited thereto. The width of the forming surface throughout is 0.750" from flat marginal edge 67 to contoured marginal edge 68. The entire actual length of the forming surface from end to end thereof, as measured along the straight, flat marginal edge 67 in the horizontal plane of the molding surface 54, is 11.798". Each narrow, flat end surface 65, 66 of the forming surface is 0.250" measured along the marginal edge 67.

The contoured smooth surface, between positions "D—D," has an actual overall length of 11.298" measured along the straight, flat marginal edge 67, and has 21 undulations in which each crest 69, 69 and each hollow 70, 70 is of 0.381" radius and is of 0.111" maximum height above or below the level of the straight marginal edge 67. The horizontal distance from the centerline of one crest 69 to the centerline of the adjacent hollow 70 is 0.538". The theoretical overall length, however, of the contoured smooth surface is 8.840" as established by the arcuate length of the centerline 46a along its 100° curve or bend with a 5" radius of curvature between positions "A—A" in the commercial slide fastener 20a. The difference between the actual overall length of 11.928" and the theoretical overall length of 8.840" amounts to 2.458" which is in the increased or surplus length provided for the purposes discussed hereinabove.

For convenience of manufacture and servicing of the mold, the forming surface of each stringer-shaping means 63, 64 is provided by the shaped upper face of an elongated insert bar 71, 71 of aluminum alloy, steel or other suitable metal which is rigid and resistant to distortion under the temperatures and pressures encountered in vulcanizing rubber. As shown in Figs. 4 and 8, the elongated insert bar 71 is disposed and press fitted in a suitable recess in the lower mold plate 51, whereby the bar is firmly supported against movement and has the straight, planar side marginal edge 67 in the plane of the molding surface 54 and has the crests 69, 69 and hollows 70, 70, respectively, rising and falling above the plane of the molding surface 54.

The molding surface 54 of the lower mold plate 51 at its flat planar area 54b to the other side of the separating rib 55 does not require additional stringer-shaping means for the other or inner fabric stringer 38 of the fastener 20a, but is continuously flat and planar from end to end and from the teeth-receiving groove 57 to the side recess 59. When the teeth 36, 36 of the inner fabric stringer 38 are seated in the groove 57, the continuously flat, planar molding surface 54 at its side area 54b entirely underlies the fabric stringer 38 including its straightened curved reaches for supporting the same, whereby during the molding operation the fabric stringer is maintained and formed and shaped flat and planar throughout its entire width and length, the limited surplus and the give of the fabric material facilitating this result even though localized tautness resulting in limited narrowing of the fabric may be present at the straightened curved reaches. Objectionable wringles and stretching in the stringer 38 are avoided.

The upper mold plate 52 of suitable metal such, for example, as aluminum alloy is constructed and arranged to fit superimposed upon the lower mold plate 51 and has a suitable upper face 52a as for contacting the upper platen of a suitable curing press (not shown). The upper mold plate 52 has its opposite or lower face (shown uppermost in Fig. 5) constituting a flat, planar molding surface 72 for overlying and registering with the molding surface 54 of the lower mold plate 51, when the mold plates 51, 52 are superimposed for molding purposes. Suitable outward projections 73, 74 are provided along the two sides of the upper mold plate so that they extend above the level of the molding surface 72 for mating and registering with the side recesses 58, 59 of the lower molding plate. Continuous shallow depressions 75, 76 are provided in the molding surface 72 along its side margins inwardly of the projections 73, 74 for accommodating overflow of the rubber material during the molding and vulcanizing operation.

The molding surface 72 has a pair of continuous molding grooves 77, 78 of suitable shape in cross-section and dimensions extending spaced-apart and parallel and centrally therein from end to end thereof for directly overlying the teeth-receiving grooves 56, 57 in the lower mold plate 51 and for shaping and molding the continuous, resilient rubber, sealing elements 40, 41 in part upon the teeth 35, 36 and in part upon the fabric stringers 37, 38, as shown in Figs. 2 and 13. Between the molding grooves 77, 78 for the sealing elements extends a flat spacer face 79 having a narrow, shallow, continuous recess 80 therein for rubber overflow purposes, the spacer face 79 being adapted to directly overlie the upraised separating rib 55 in the lower mold plate 51 for facilitating the provision of a thin connecting web of rubber between the sealing elements during the molding operation.

This construction and arrangement provides side areas 72a and 72b in the flat molding surface 72 substantially corresponding to and adapted to overlie the related side areas 54a and 54b, respectively, of the flat molding surface 54, when the upper 52 and lower 51 mold plates are superimposed for the molding operation, sufficient clearance being provided between the surfaces 54, 72 to avoid objectionable pressure upon the fabric stringers yet facilitate flow of rubber across a face of the stringers. The upper mold plate 52 in its side area 72a has a pair of stringer-shaping means 83, 84 comprising suitable elongated insert bars 81, 81 mounted and press fitted in suitable elongated recesses in the upper mold plate as shown in Fig. 9. The insert bars 81, 81, for the particular embodiment shown, are alike in construction. They are located at longitudinally spaced-apart positions in the molding surface 72, as shown in Fig. 5, corresponding to the spaced-apart positions of the insert bars of the means 63, 64 in the molding surface 54, and are located contiguous to a side of the molding groove 78, so that they are directly overlying and registering with the insert bars of means 63, 64 in the molding operation.

The insert bars 81, 81 have shaped upper faces exposed at the molding surface 72 providing suitable, similar, rigid forming surfaces comprising the third and fourth stringer-shaping means 83 and 84, respectively. The forming surface of the means 83, for example, comprises a suitable elongated, contoured or undulated smooth surface intermediate suitable narrow, flat end surfaces which merge smoothly with adjacent planar portions of the molding surface 72. All the dimensions of each forming surface such, for example, as that of the means 83, correspond to those of the forming surface of the means 63, but the contoured or undulated smooth surface of the means 83 has its rhythmic succession of rounded wave-like crests 85, 85 and hollows 86, 86 constructed and arranged for disposition in complementary relation to those in the contoured smooth surface of the means 63. That is, when the mold plates 51, 52 are in superimposed relation, the crests 85, 85 of the contoured smooth surface of the means 83 are positioned conformingly in the hollows 70, 70, while the hollows 86, 86 of the contoured smooth surface of the means 83 accommodate the crests 69, 69 conformingly therein, whereby the rigid forming surface of the means 83 positively presses the flexible fabric stringer 37 into continuous conformance with the rigid forming surface including the undulated smooth surface portion thereof of the means 63 during the molding operation.

*Method steps*

The molding apparatus 51, 52 is designed for use in effecting the method aspects of the invention. The upper 52 and lower 51 mold plates are separated and disposed molding surfaces 72, 54 uppermost upon a suitable support or table (not shown). The continuous strip of standard commercial slide fastener 20a of the nonsealing type having the spaced, pre-formed laterally curved reaches therein is arranged in fully separated condition of the fabric stringers 37, 38 and teeth 35, 36 by virtue of known manipulation of the slider or runner 39, thereby permitting the temporary straightening of both stringers 37, 38 continuously throughout their length.

The outer fabric stringer 37 is placed and retained in a straight condition upon and along the flat molding surface 54 at its side area 54a, and the lower parts of all the teeth 35, 35 are inserted, seated and retained in the straight teeth-receiving channel 56 in the lower mold plate 51, as shown especially in Fig. 12, so that the upper faces of all the teeth 35, 35 are flush with i.e. in the same horizontal plane as the flat upper face of the separating rib 55. Such placement of the outer fabric stringer 37 and its teeth 35, 35 is done in a manner to dispose all the material of each pre-formed laterally curved portion of the stringer 37 in a temporarily straight, loose condition, that is, a ruffled disposition upon and overlying one of the undulating forming surfaces of the spaced stringer-shaping means 63 and 64. It has been found that generally some localized longitudinal shifting and localized smoothing and working i.e. stretching, or shortening, or both, of the fabric material of the stringer 37 are required along the normally straight regions of the stringer, especially the straight region between the spaced-apart laterally curved portions thereof, so that all the fabric material of each said curved portion in the temporary, ruffled, straight condition lies wholly within the spaced-apart end boundaries of one of said undulating forming surfaces and overlies the lateral undulations in the forming surface. This localized shifting and working makes feasible accommodating the manufacturing tolerances found in the standard commercial slide fastener 20a.

The inner fabric stringer 38 in a temporary straight condition is then placed and retained upon and along the flat molding surface 54 at its other side area 54b, and the lower parts of all the teeth 36, 36 are inserted, seated and retained in the other straight teeth-receiving channel 57 in the lower mold plate 51, as shown especially in Fig. 12, so that the upper faces of all the teeth 36, 36 are flush with the flat upper face of the separating rib 55. Such placement of the inner fabric stringer 38 is done in a manner to locate the pre-formed laterally curved portions of the stringer in their temporary, straight, relatively taut, narrowed condition at positions directly opposite the undulating forming surfaces of the stringer-shaping means 63 and 64, respectively. The give and local stretchability of the fabric material of the stringer 38 facilitates the temporary straightening with localized narrowing of the stringer.

A thin, flexible shield 87 of suitable metal is next positioned directly upon the separating rib 55 and the upper faces of the teeth 35, 35 and 36, 36 and over only the engaging portions of the teeth, as shown especially in Fig. 12, and a suitable adhesive may, if desired, be painted on the exposed upper and outer end faces of the mounting portions of the teeth 35, 35 and 36, 36, and on upper faces of the fabric stringers 37 and 38 for promoting the adhesion of rubber composition to all such exposed faces. The shield 87 bridging the engaging portions of the teeth desirably overlies in part the beaded marginal edge 37a, 38a of each fabric stringer 37, 38, so that both said edges together with the shield 87 function as a dam against the penetration of rubber composition between the teeth at their engaging portions. An extruded strip 88 of suitable, unvulcanized, resilient rubber composition for providing the desired elastic flexibility of the sealing elements, is then positioned along and overlying the shield 87, the exposed mounting portions of the teeth 35, 35 and 36, 36 and desirably in part the portions of the fabric stringers 37, 38 closely adjacent the teeth. The rubber strip 88 has sufficient material to at least form the sealing elements 40, 41 and provide a thin, continuous sealing layer or coating 42, 43 of rubber upon the upper face of each stringer.

The next step is to close the mold apparatus by mounting the upper mold plate 52 upon the lower mold plate 51 with their flat molding surfaces 54 and 72 in registered, superimposed, face-to-face relation, while the side projections 73, 74 of the upper mold plate are seated matingly in the side recesses 58, 59 of the lower mold plate 51, and while the stringer-shaping means 83, 84 in the upper mold plate directly overlie the stringer-shaping means 63, 64 in the lower mold plate. The closed mold apparatus is disposed between the platens of a known type of curing press (not shown) and the contained slide fastener 20a and rubber strip 88 subjected to heat and pressure sufficient to vulcanize and fully cure the rubber composition and integrally unite the fabric and rubber parts of the slide fastener, and to form the rubber sealing elements of the desired shape and bond the same to the teeth. It is to be noted that this also produces a very thin web of rubber composition between the shield 87 and the flat, recessed, narrow face 79 in the upper molding plate 52, which web extends between and is joined to the tapered marginal portions of the spaced-apart sealing elements 40, 41 of the slide fastener when the latter is removed in its "as molded" condition from the opened mold apparatus.

During this phase of the molding operation, the flat planar areas of the superimposed molding surfaces 54, 72 apply sufficient pressure to the fabric stringers 37, 38 to iron out any wrinkles and distribute any looseness in the normally straight reaches of the stringers and to maintain the stringers in a straight flat condition, while the thin, continuous sealing layers 42, 43 of rubber are formed upon and bonded to the faces of the stringers. This advantageously avoids objectionable wrinkles, non-uniformity in thickness of the sealing layer, and other related defects.

While the ironing out and flattening of the normally straight reaches of the stringers 37, 38 are being effected, the portions of the flat planar areas 54b and 72b of the molding surfaces 54, 72 directly opposite the respective stringer-shaping means press and flatten the relatively taut, narrowed and straightened reaches of the inner fabric stringer 38 at its pre-formed laterally curved portions without destroying the pre-formed lateral curvature of the stringer, the give of the fabric facilitating such flattening.

At the same time, the forming surfaces including the lateral undulations therein of the stringer-shaping means 83, 84 in the upper mold plate 52 press the surplus material and the straightened reaches of the outer fabric stringer 37 at its pre-formed laterally curved portions into full, smooth and mating conformance with the underlying forming surfaces including the lateral undulations therein of the stringer-shaping means 63, 64 in the lower mold plate 51. This is accomplished without destroying the pre-formed lateral curvature of the stringer and without producing objectionable stresses and wrinkles in the contoured lengths of the stringer 37 along the stringer-shaping means, by virtue of the give and the surplus of fabric material along the respective stringer-shaping means, and by virtue of the particular construction and arrangement of the undulated forming surfaces.

Thus, the molding and shaping of the sealing elements 40, 41 and the forming of the thin continuous sealing layers 42, 43 upon both of the fabric stringers 37, 38 are done while both stringers including their spaced, laterally curved portions are maintained in a straight line. At the end of the curing period, the mold apparatus is removed from the curing press and then opened by lifting the upper mold plate 52 entirely away from the lower mold plate 51. Both rubber coated fabric stringers 37, 38 and their associated teeth 35, 36 together with their molded rubber, web-connected sealing elements 40, 41 and the shield 87 between the web and the teeth, are stripped as a unit from the lower mold plate 51, after which stripping operation the shield 87 is next removed and then the rubber connecting web is severed from the tapered marginal portions of the molded rubber sealing elements, whereby the molded slide fastener is in the fully separated condition shown in Fig. 13.

The teeth 35, 36 of the molded slide fastener 20 may next be engaged by suitable manipulation of the slider 39 so as to join detachably the fabric stringers 37, 38 and draw the tapered marginal portions of the sealing elements 40, 41 into overlapping contacting engagement, thereby placing the molded slide fastener 20 in the closed condition shown in Fig. 14. Preferably, any flash i.e. excess rubber is trimmed from the outer marginal edges of the rubber coated fabric stringers 37, 38.

After removal of the molded slide fastener 20 from the mold apparatus and upon subsequent engagement of the teeth, the straight molded, laterally curved portions of the fabric stringers 37, 38 have an inherent elastic recovery due in part to their said pre-forming and in part to relief of the stresses in the fabric material, especially tension stresses in that of the inner stringer 38, whereby the molded, laterally curved portions assume, as shown in Fig. 14, a sharpness of curvature approximately one-half that of the pre-formed laterally curved portions of the slide fastener 20a shown in Fig. 3. The inner fabric stringer 38 retains a generally flat smooth condition at its curved reaches, but the outer fabric stringer 37 retains a relatively loose, wavy condition at its curved reaches. This makes feasible conveniently fitting the molded slide fastener 20 to not only the designed radius of curvature, but to substantially greater and to slightly lesser radii of curvature, especially when the stringers can be separated and individually fitted to the structure to be closed by the fastener 20, and also makes feasible limited shifting of the center of radius of curvature longitudinally of the molded slide fastener 20 as may be necessary for some applications of the fastener.

However, for some applications the individual fitting and shaping of the molded fabric stringers to a particular curve is undesirable for cost and other reasons, in which case the molded slide fastener 20 may again be subjected to heat and pressure for a limited time, while the laterally curved portions of the fastener are maintained at the desired exact or slightly sharper curvature for a particular installation, whereby the laterally curved portions of the fastener are provided with a permanent set of the fabric and rubber parts, so that said curved portions retain the exact curvature required. Of course, this slightly overcures the rubber composition, hence a suitable rubber composition capable of withstanding limited overcure is used.

*Final-shaping mold apparatus*

The desired permanent set of the laterally curved portions of the molded slide fastener 20 can be conveniently accomplished by use of the final-shaping mold apparatus, shown in Figs. 15 and 16, comprising upper 90 and lower 91 mold plates of suitable metal having flat, planar molding surfaces 92 and 93, respectively, adapted to be arranged in superimposed, face-to-face relation. The molding surface 93 of the lower mold plate 91 has a forming groove 94 of generally rectangular shape in cross-section with oppositely inclined sides extending therein along an arcuate path and having dimensions sufficient to accommodate the sealing elements 40, 41 in their overlapping contacting relation for the closed condition of the molded slide fastener 20 and when the latter is inverted with the fabric stringers 37, 38 resting flush against the molding surface 93. The forming groove 94 may have straight portions in continuation of its arcuate portion. The position of the centerline 94a of the forming groove corresponds to the position of the centerline or median line 46 of engagement of the teeth 35, 36 of the fastener 20, and the centerline 94a along the arcuate portion of the forming groove 94 has a radius of curvature corresponding or substantially corresponding to the desired exact radius of curvature of the centerline 46 of the molded slide fastener 20 in its final-shaped, permanent set condition. The length of the arcuate portion of the forming groove 94 is sufficient to provide the desired arcuate length of a permanently set, laterally curved portion of the molded slide fastener 20 as measured along its centerline 46.

The lower mold plate 91 has a plurality of metal retaining or guide pins 95, 96 secured in and projecting upwardly from its molding surface 93, the guide pins being disposed in series and spaced-apart along arcuate lines radially spaced from the sides of the forming groove 94 so that one series of guide pins 96, 96 is at the outer marginal edge of one stringer 37 and the other series of guide pins 95, 95 is at the outer marginal edge of the other stringer 38, when the slide fastener 20 is positioned upon the molding surface 93 and in the forming groove 94 as shown in Figs. 15 and 16. The guide pins 95, 96 are received in suitable openings 97, 98 in the molding surface 92 of the upper mold plate 90, and function to retain the fabric stringers in the desired lateral curvature during the final-shaping operation.

The upper mold plate 90 has a shallow, rectangular in cross-section recess 99 in its molding surface 92 for accommodating the exposed parts of the engaged teeth 35, 36, when the upper and lower mold plates are superimposed and in the closed condition with sufficient clearance between the molding surfaces 92, 93 to avoid objectionable pressure upon the fabric stringers and flow of the rubber of the coatings 42, 43. The recess 99 is arranged to directly overlie and extend along a path corresponding to that of the forming groove 94.

In the operation of the final-shaping mold apparatus, the upper 90 and lower 91 mold plates are separated; and then the molded slide fastener 20 in its "as molded" condition but with the sealing elements 40, 41 and the teeth 35, 36 engaged as shown in Fig. 14, is mounted inverted upon the flat molding surface 93 of the lower mold plate so that the engaged sealing elements 40, 41 are seated in and extend conformingly along the forming groove 94, while the laterally curved portions of the fabric stringers 37, 38 abut the molding surface 93 to the sides of the forming groove and between the opposed, spaced-apart series of guide pins 95, 96 and are retained in the desired arcuate curvature by the guide pins 95, 96. Next, the upper mold plate 90 is superimposed upon the lower mold plate 91 and the supported slide fastener 20 so that the guide pins 95, 96 extend into the openings 97, 98 whereby the final-shaping mold apparatus is in its closed condition for placing in the curing press. The closed mold apparatus having the molded slide fastener 20 therein is mounted in the curing press and the molded slide fastener then subjected to heat and pressure for a limited time such, for example, as about 5 minutes. This irons or presses out any waviness and eliminates looseness in the outer fabric stringer 37 at its curved reach and maintains both fabric stringers 37, 38 flat and in the desired exact lateral curvature, while effecting a permanent set in the fabric and rubber parts of the molded slide fastener 20, all without producing objectionable wrinkles in and weakening of the fabric stringers 37, 38.

At the end of the over-cure period, the mold apparatus is removed from the curing press and is opened, whereupon the molded slide fastener 20 in its final-shaped, engaged condition is stripped from the lower mold plate 91. The fabric stringers and the sealing elements retain the desired exact lateral curvature established by the final-shaping mold apparatus, and resist return to a greater radius of curvature by virtue of the permanent set produced in the fabric and rubber parts by the slight over-cure and second application of pressure. The molded slide fastener 20 in its final-shaped, permanent set condition is shown in Fig. 17.

Variations may be made without departing from the scope of the invention as it is defined in the following claims.

I claim:

1. A molded sealing slide fastener closure including a laterally curved portion thereof, said closure comprising a pair of elongated attaching margins of flexible material with the attaching margin of lesser radius of curvature having a substantially flat configuration throughout its laterally curved part in the closed condition of said closure, the other attaching margin having a succession of interconnected molded undulations througout its laterally curved part in the closed condition of said closure with each undulation extending radially from the outer edge of said other attaching margin across the major part of the width thereof and decreasing in depth toward the radially inner edge thereof, cooperating slide fastener elements mounted in series on said attaching margins at adjacent edges thereof, a slider for engaging and disengaging said fastener elements, and a pair of sealing elements of elastomeric material with cooperating interengageable marginal portions molded on and extending continuously along said attaching margins at said fastener elements, said sealing elements in the closed condition of the closure having their marginal portions interengaged in sealing relationship.

2. A molded sealing slide fastener closure including a laterally curved portion thereof, said closure comprising a pair of elongated attaching margins of textile fabric with the attaching margin of lesser radius of curvature having a substantially flat configuration throughout its laterally curved part in the closed condition of said closure, the other attaching margin having a succession of interconnected generally rounded-in-section molded undulations throughout its laterally curved part in the closed condition of said closure with each undulation extending radially from the outer edge of said other attaching margin across the major part of the width thereof and gradually decreasing in depth toward the radially inner edge thereof, cooperating slide fastener elements mounted in series on said attaching margins at adjacent edges thereof, a slider for engaging and disengaging said fastener elements, and a pair of sealing elements of elastomeric material with cooperating interengageable tapered marginal portions molded on and extending continuously along said attaching margins at said fastener elements, said sealing elements in the closed condition of the closure having their tapered marginal portions interengaged in overlapping sealing relationship.

3. A molded sealing slide fastener closure including a laterally curved portion thereof said closure comprising a pair of elongated attaching margins of impervious textile fabric with the attaching margin of lesser radius of curvature having a substantially flat configuration throughout its laterally curved part in the closed condition of said closure, the other attaching margin having a succession of interconnected rounded-in-section molded substantially uniform undulations throughout its laterally curved part in the closed condition of said closure with each undulation extending radially from the outer edge of said other attaching margin to substantially the radially inner edge thereof and gradually decreasing in depth toward said radially inner edge, cooperating slide fastener elements mounted in series on said attaching margins at adjacent edges thereof, a slider for engaging and disengaging said fastener elements, and a pair of sealing elements of elastomeric material with cooperating interengageable tapered marginal portions molded on and extending continuously along said attaching margins at said fastener elements, said sealing elements in the closed condition of the closure having their tapered marginal portions interengaged in overlapping sealing relationship.

4. A molded sealing slide fastener closure including a laterally curved portion thereof, said closure comprising a pair of elongated attaching margins of flexible material with the attaching margin of lesser radius of curvature having a substantially flat configuration throughout its laterally curved part in the closed condition of said closure, the other attaching margin having a succession of interconnected molded undulations throughout its laterally curved part in the closed condition of said closure with each undulation extending radially from the outer edge of said other attaching margin across at least half the width thereof and decreasing in depth toward the radially inner edge thereof, cooperating slide fastener elements mounted in series on said attaching margins at adjacent edges thereof, a slider for engaging and disengaging said fastener elements, and a pair of sealing elements of elastomeric material with cooperating interengageable marginal portions molded on and extending continuously along said attaching margins at said fastener elements, said sealing elements in the closed condition of the closure having their marginal portions interengaged with the engaging edge of the radially inner sealing element in a state of tension and the engaging edge of the radially outer sealing element in a state of compression.

5. A molded sealing slide fastener closure including a laterally curved portion thereof, said closure comprising a pair of elongated attaching margins of textile fabric with the attaching margin of lesser radius of curvature having a substantially flat configuration throughout its laterally curved part in the closed condition of said closure, the other attaching margin having a succession of interconnected generally rounded-in-section molded undulations throughout its laterally curved part in the closed condition of said closure with each undulation extending radially from the outer edge of said other attaching margin across at least half the width thereof and gradually decreasing in depth toward the radially inner edge thereof, cooperating slide fastener elements mounted in series on said attaching margins at adjacent edges thereof, a slider for engaging and disengaging said fastener elements, and a pair of sealing elements of elastomeric material with cooperating interengageable tapered marginal portions molded on and extending continuously along said attaching margins at said fastener elements, said sealing elements in the closed condition of the closure having their tapered marginal portions interengaged with the tapered edge of the radially inner sealing element in a state of tension and the tapered edge of the radially outer sealing element in a state of compression.

6. A molded sealing slide fastener closure including a laterally curved portion thereof, said closure comprising a pair of elongated attaching margins of impervious textile fabric with the attaching margin of lesser radius of curvature having a substantially flat configuration throughout its laterally curved part in the closed condition of said closure, the other attaching margin having a succession of interconnected rounded-in-section molded substantially uniform undulations throughout its laterally curved part in the closed condition of said closure with each undulation extending radially from the outer edge of said other attaching margin to substantially the radially inner edge thereof and gradually decreasing in depth toward said radially inner edge, cooperating slide fastener elements mounted in series on said attaching margins at adjacent edges thereof, a slider for engaging and disengaging said fastener elements, and a pair of sealing elements of elastomeric material with cooperating interengageable tapered marginal portions molded on and extending continuously along said attaching margins at said fastener elements, said sealing elements in the closed condition of the closure having their tapered marginal portions interengaged with the tapered edge of the radially inner sealing element in a state of tension and the tapered edge of the radially outer sealing element in a state of compression.

References Cited in the file of this patent

UNITED STATES PATENTS

| | | |
|---|---|---|
| 41,907 | Crosby | Mar. 15, 1864 |
| 1,772,956 | Moore | Aug. 12, 1930 |
| 2,070,753 | Schatzky | Feb. 16, 1937 |
| 2,273,994 | Rochester | Feb. 24, 1942 |
| 2,504,705 | Leguillon | Apr. 18, 1950 |
| 2,548,305 | Gora | Apr. 10, 1951 |
| 2,557,827 | Krupp | June 19, 1951 |
| 2,615,224 | Shur | Oct. 28, 1952 |
| 2,719,331 | Harris | Oct. 4, 1955 |
| 2,796,649 | Soave | June 25, 1957 |

FOREIGN PATENTS

| | | |
|---|---|---|
| 464,575 | Great Britain | Apr. 20, 1937 |